(12) United States Patent
Leung et al.

(10) Patent No.: US 6,502,561 B2
(45) Date of Patent: Jan. 7, 2003

(54) COVER FOR A FUEL PRESSURE REGULATOR OF AN AIR ASSIST FUEL INJECTION SYSTEM

(75) Inventors: Johnny Leung, Newport News, VA (US); Todd Matthew Answine, Newport News, VA (US); Daryl Oran Codling, Gloucester, VA (US); Mario Charles Muscat, Perth (AU)

(73) Assignee: Synerject, LLC, Newport News, VA (US)

( * ) Notice: Subject to any disclaimer, the term of this patent is extended or adjusted under 35 U.S.C. 154(b) by 20 days.

(21) Appl. No.: 09/736,260

(22) Filed: Dec. 15, 2000

(65) Prior Publication Data

US 2002/0073976 A1 Jun. 20, 2002

(51) Int. Cl.$^7$ .............................................. F02M 23/00
(52) U.S. Cl. ....................................... 123/531; 123/457
(58) Field of Search ................................ 123/533, 531, 123/535, 457, 459, 461, 456, 447; 137/510, 315

(56) References Cited

U.S. PATENT DOCUMENTS

| | | | |
|---|---|---|---|
| 3,241,805 A | * | 3/1966 | Schumann ................... 251/85 |
| 3,789,819 A | | 2/1974 | Moulds |
| 4,161,964 A | | 7/1979 | Greiner et al. |
| 4,475,486 A | | 10/1984 | Kessler |
| 4,674,462 A | | 6/1987 | Koch et al. |
| 4,693,223 A | | 9/1987 | Eshleman et al. |
| 4,756,289 A | | 7/1988 | Rock et al. |
| 4,934,329 A | | 6/1990 | Lear et al. |
| 4,991,556 A | | 2/1991 | Mahnke et al. |
| 5,024,202 A | | 6/1991 | McKay |
| 5,070,844 A | | 12/1991 | Daly |
| 5,094,211 A | | 3/1992 | Mahnke et al. |
| 5,101,800 A | | 4/1992 | Schumann et al. |
| 5,123,399 A | | 6/1992 | Motoyama et al. |
| 5,156,133 A | * | 10/1992 | Sugimoto et al. ........... 123/531 |
| 5,207,205 A | | 5/1993 | Mesenich |
| 5,261,375 A | | 11/1993 | Rush, II et al. |
| 5,279,327 A | | 1/1994 | Alsobrooks et al. |
| 5,291,822 A | | 3/1994 | Alsobrooks et al. |
| 5,315,968 A | | 5/1994 | Niebrzydoski |
| 5,320,078 A | | 6/1994 | Lorraine |
| 5,381,816 A | | 1/1995 | Alsobrooks et al. |
| 5,577,478 A | | 11/1996 | Tuckey |
| 5,577,480 A | | 11/1996 | Gmelin et al. |
| 5,666,927 A | * | 9/1997 | Pace et al. ................... 123/533 |
| 5,794,600 A | | 8/1998 | Hill |
| 6,053,149 A | | 4/2000 | Lorraine |

* cited by examiner

*Primary Examiner*—Willis R. Wolfe
*Assistant Examiner*—Mahmoud Gimie
(74) *Attorney, Agent, or Firm*—Cooley Godward LLP

(57) ABSTRACT

A cover that covers at least a portion of a fuel pressure regulator of an air assist fuel injection system and fluidly communicates pressurized gas to the fuel pressure regulator.

20 Claims, 18 Drawing Sheets

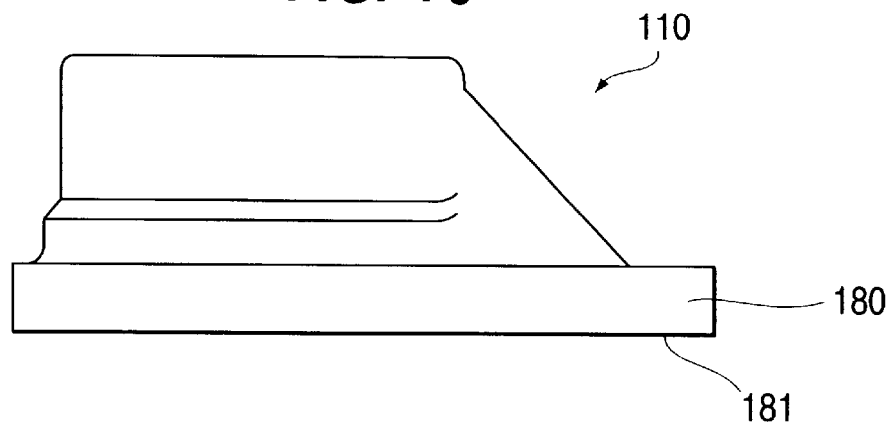
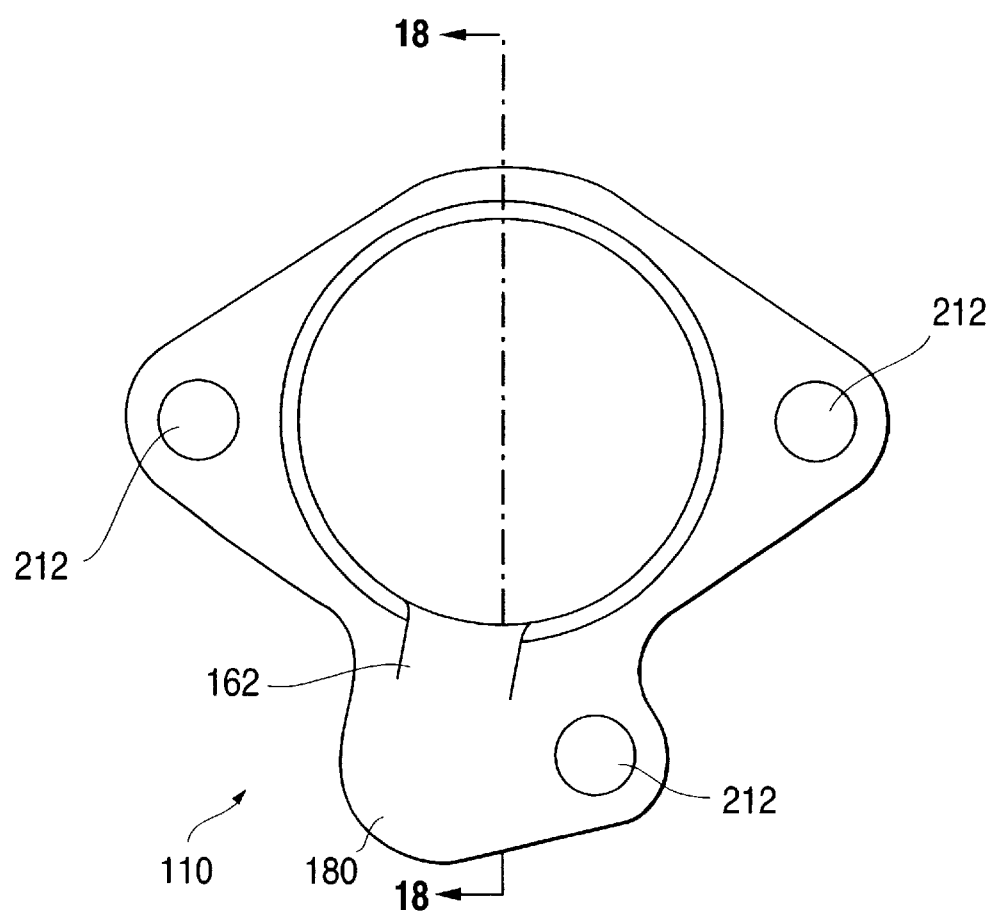

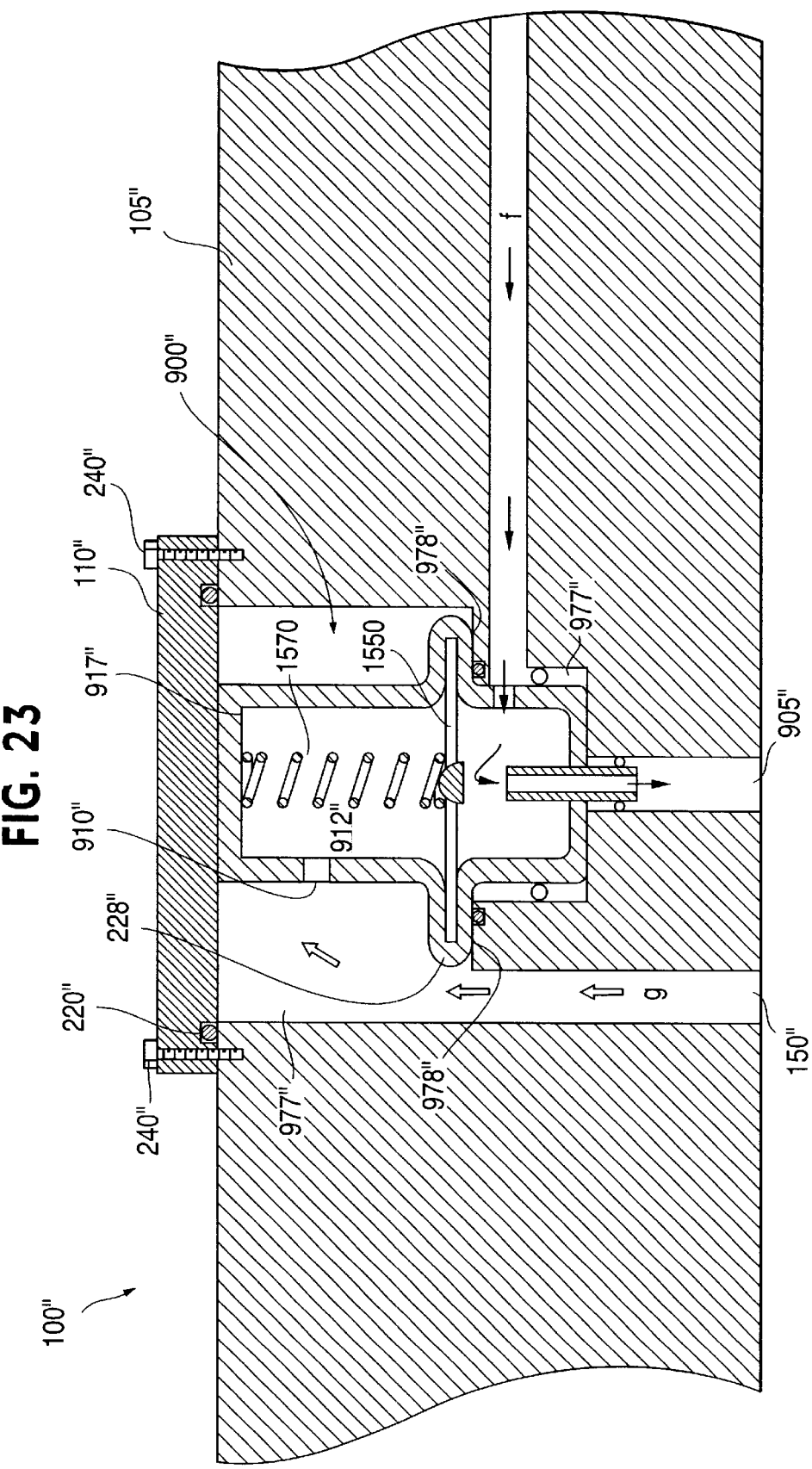

COVER FOR A FUEL PRESSURE REGULATOR OF AN AIR ASSIST FUEL INJECTION SYSTEM

BACKGROUND OF THE INVENTION

1. Field of the Invention

The present invention relates to air assist fuel injection systems and, more particularly, to covers for fuel pressure regulators of air assist fuel injection systems.

2. Description of the Related Art

Conventional fuel injectors are configured to deliver a quantity of fuel to a combustion cylinder of an engine. To increase combustion efficiency and decrease pollutants, it is desirable to atomize the delivered fuel. Generally speaking, atomization of fuel can be achieved by supplying high pressure fuel to conventional fuel injectors, or atomizing low pressure fuel with pressurized gas, i.e., "air assist fuel injection."

Conventional air assist fuel injectors are typically located in the head of an engine and are adjacent a rail that houses a conventional fuel injector and also defines a mount for the air assist fuel injector. The conventional fuel injector and the rail are configured such that a metered quantity of fuel is delivered from the fuel injector directly to the air assist fuel injector. Additionally, the rail includes a number of passageways that deliver pressurized air to the air assist fuel injector. The air assist fuel injector atomizes the low pressure fuel with the pressurized air and conveys the air and fuel mixture to the combustion chamber of the engine.

A conventional air assist fuel injection system typically includes a fuel pressure regulator, such as a diaphragm or differential pressure regulator, which generally maintains the fuel supply pressure at an acceptable level so that proper fuel flow characteristics to and through the injectors is assured. In the conventional configuration, the fuel pressure regulator maintains this fuel pressure at the desired limit by maintaining a pressure differential between the fuel supply pressure and a reference pressure, such as the air supply pressure to the air assist fuel injector. The fuel pressure regulator is typically mounted on the rail of the air assist fuel injection system, and an array of external conduits typically communicate the pressurized air and pressurized fuel from the rail to the fuel pressure regulator so that the fuel pressure regulator can maintain the aforementioned pressure differential.

The conduits that communicate the pressurized air to the fuel pressure regulator typically include exposed or external hoses and connectors, which are susceptible to damage during operation of the engine, especially during high temperature and pressure conditions. These exposed hoses and connectors also complicate the assembly of the air assist fuel injection system and are not well suited for various space-constrained engine configurations.

SUMMARY

In light of the previously described problems associated with supplying air and fuel to the fuel pressure regulators of air assist fuel injection systems, one object of the embodiments of the present invention is to provide a cover that covers a fuel pressure regulator and is configured to supply pressurized gas to the fuel pressure regulator, preferably without external hoses and connectors.

Other objects, advantages and features associated with the embodiments of the present invention will become more readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

DESCRIPTION OF THE DRAWINGS

FIG. 16 is a front view of the cover illustrated in FIG. 2.

FIG. 17 is a top view of the cover illustrated in FIG. 2.

FIG. 23 is a cross-sectional and schematic view of an assembly of the air assist fuel injection system illustrated in FIG. 1 in accordance with a further embodiment of the present invention.

DETAILED DESCRIPTION

Figure 1:
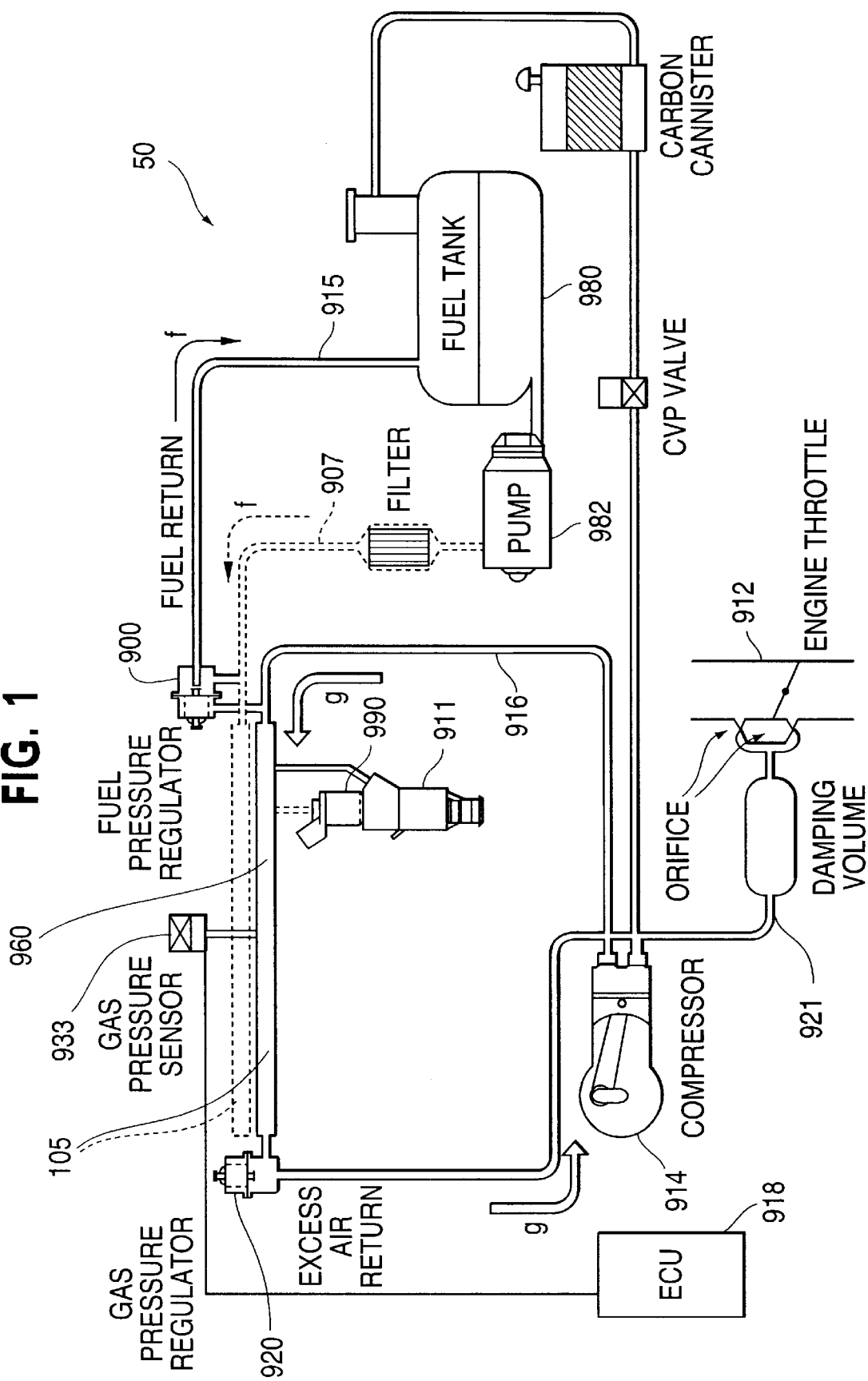
FIG. 1 is a schematic flow diagram of an air assist fuel injection system according to one embodiment of the present invention.
Figure 2:
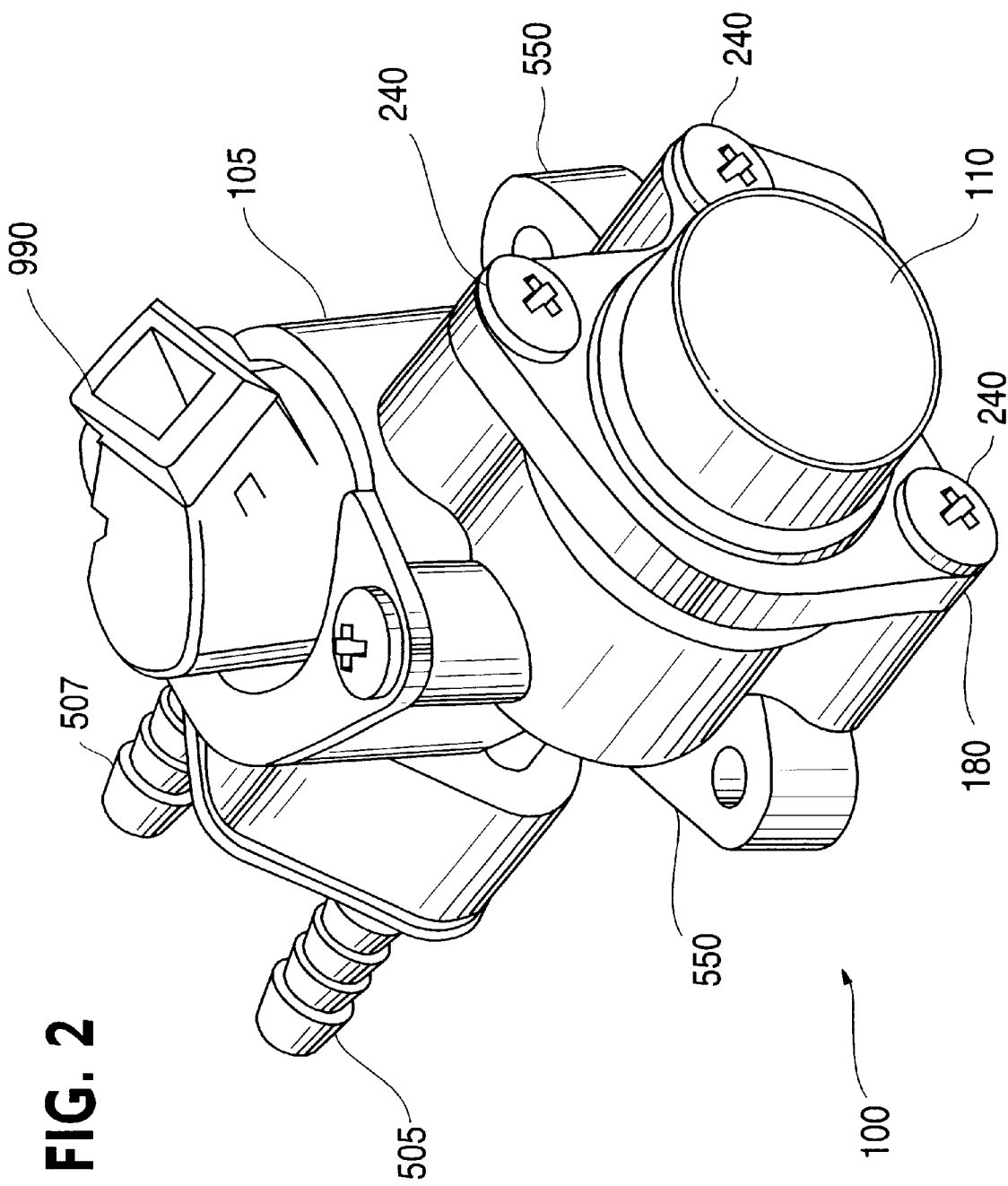
FIG. 2 is a perspective view of an assembly of the air assist fuel injection system illustrated in FIG. 1, where the assembly includes a cover that covers a fuel pressure regulator in a rail in accordance with one embodiment of the present invention.
Figure 3:
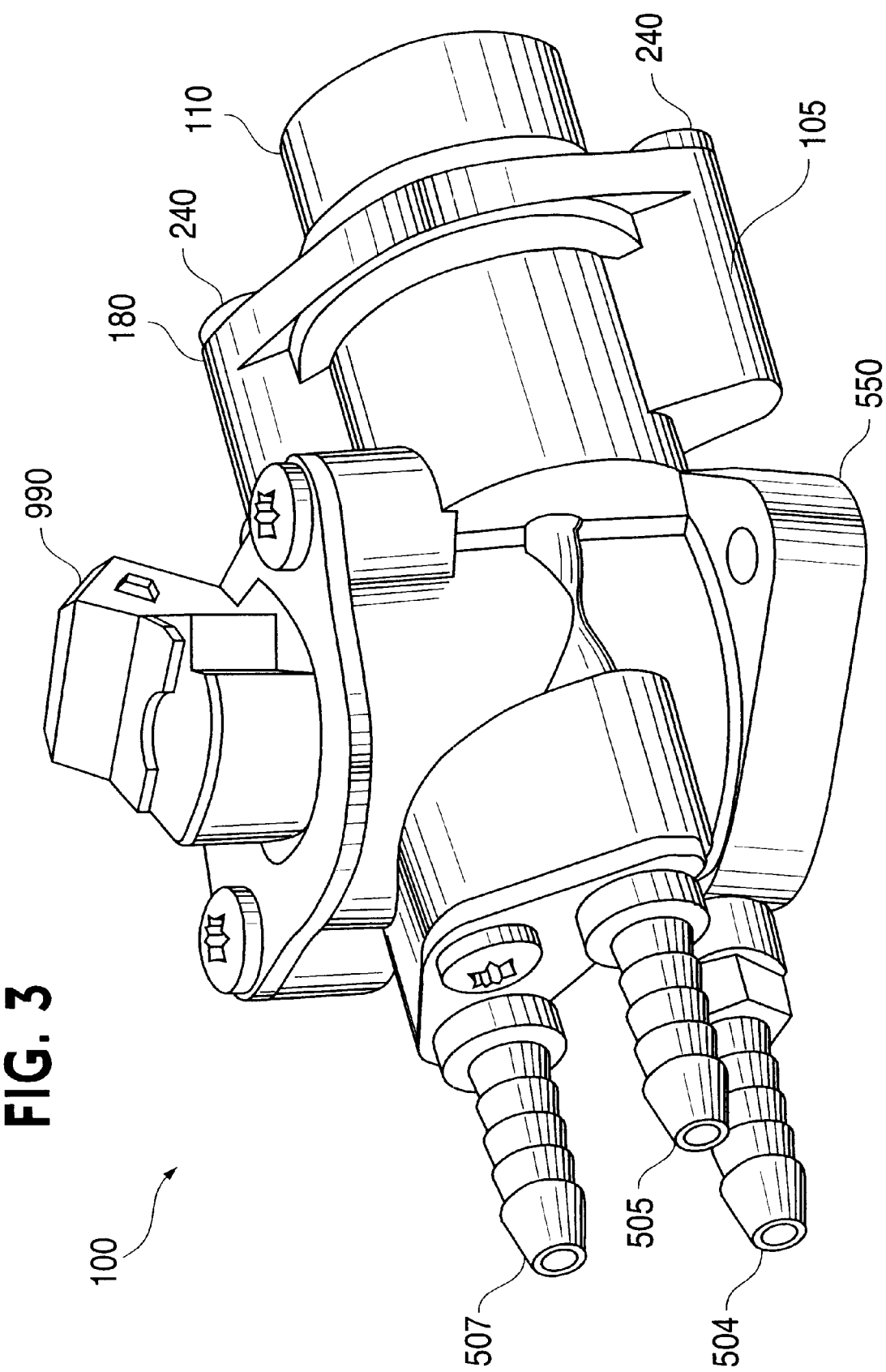
FIG. 3 is an another perspective view of the assembly illustrated in FIG. 2.
Figure 4:
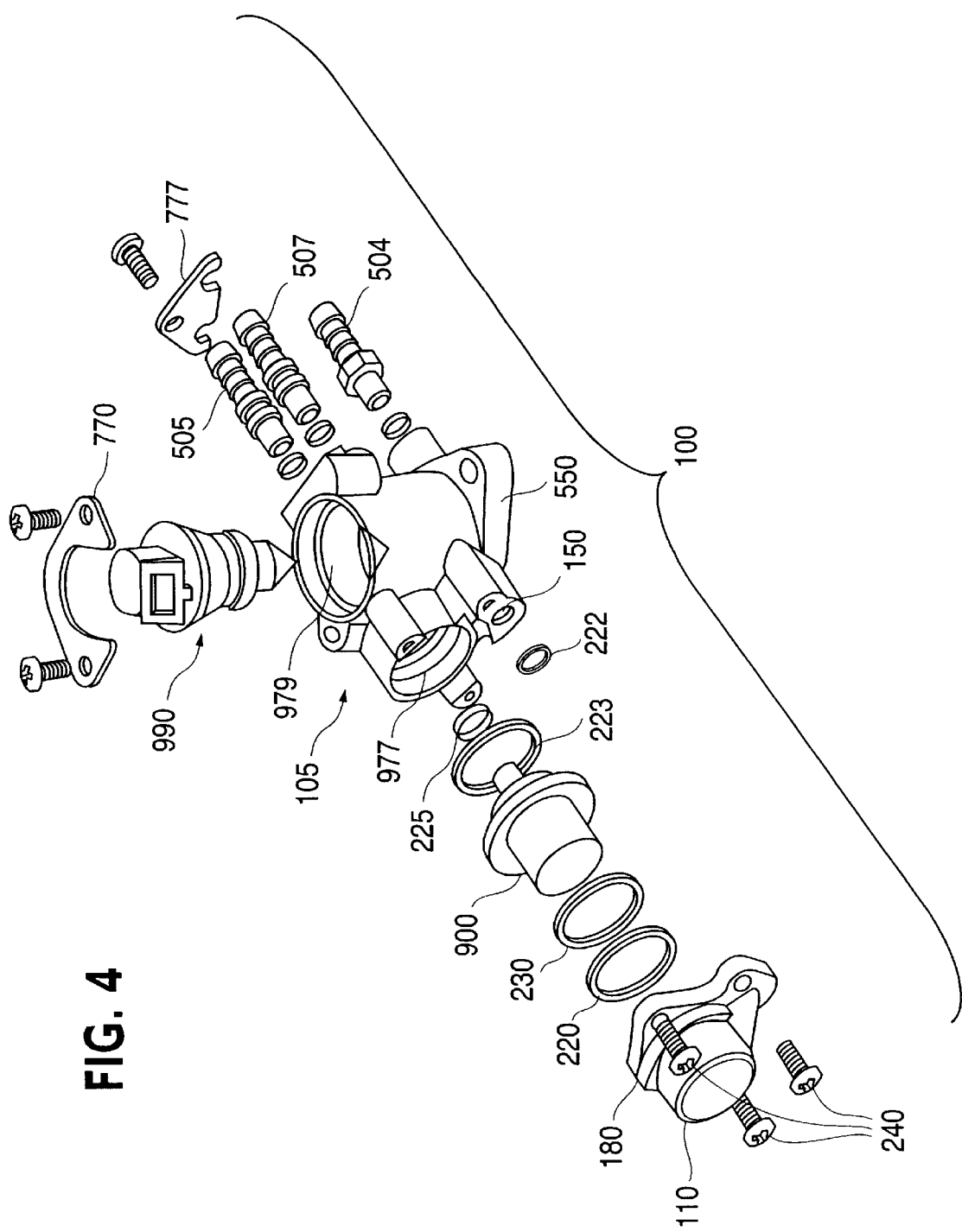
FIG. 4 is an exploded view of the assembly illustrated in FIG. 2.
Figure 5:
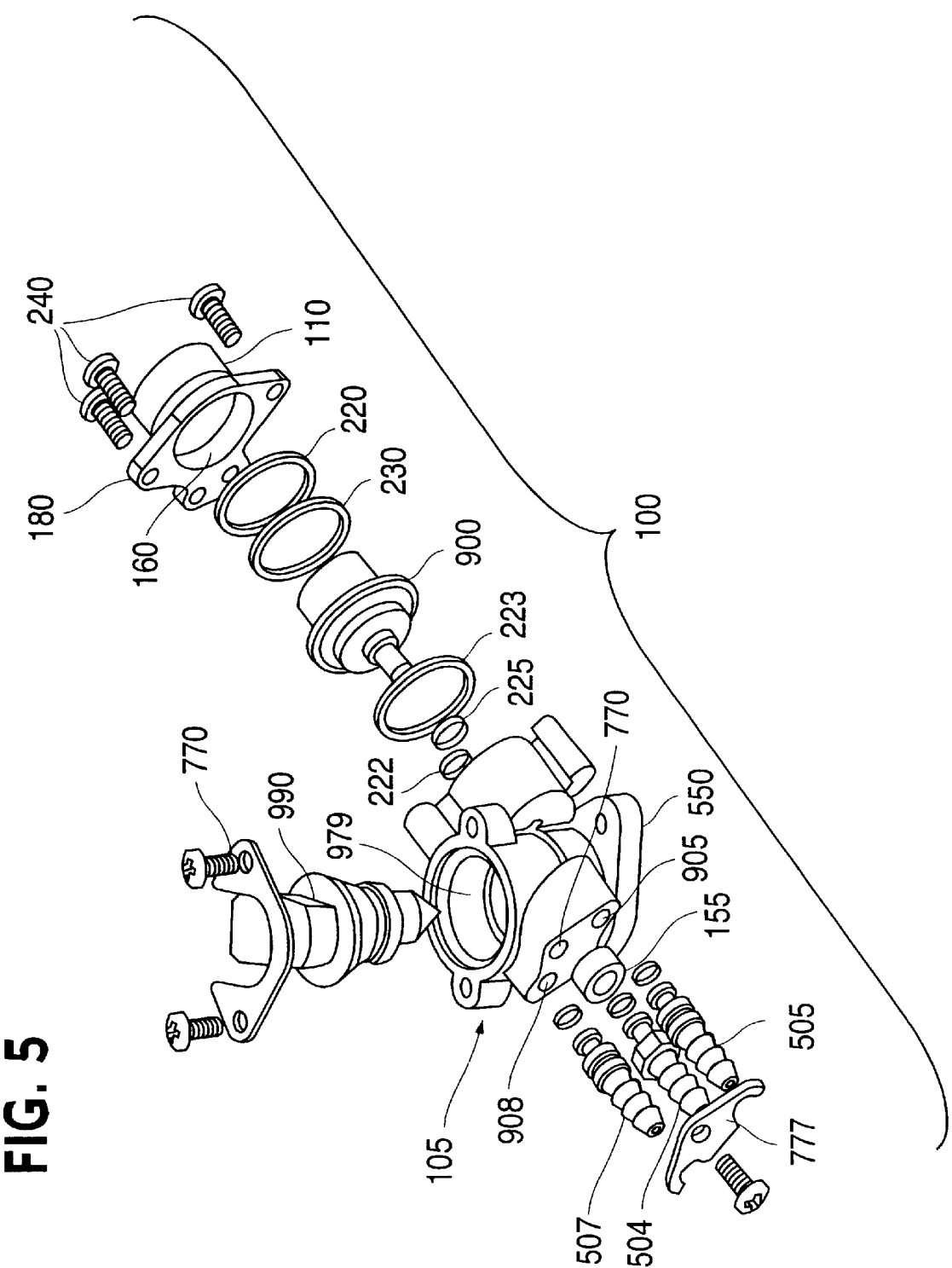
FIG. 5 is another exploded view of the assembly illustrated in FIG. 2.
Figure 6:
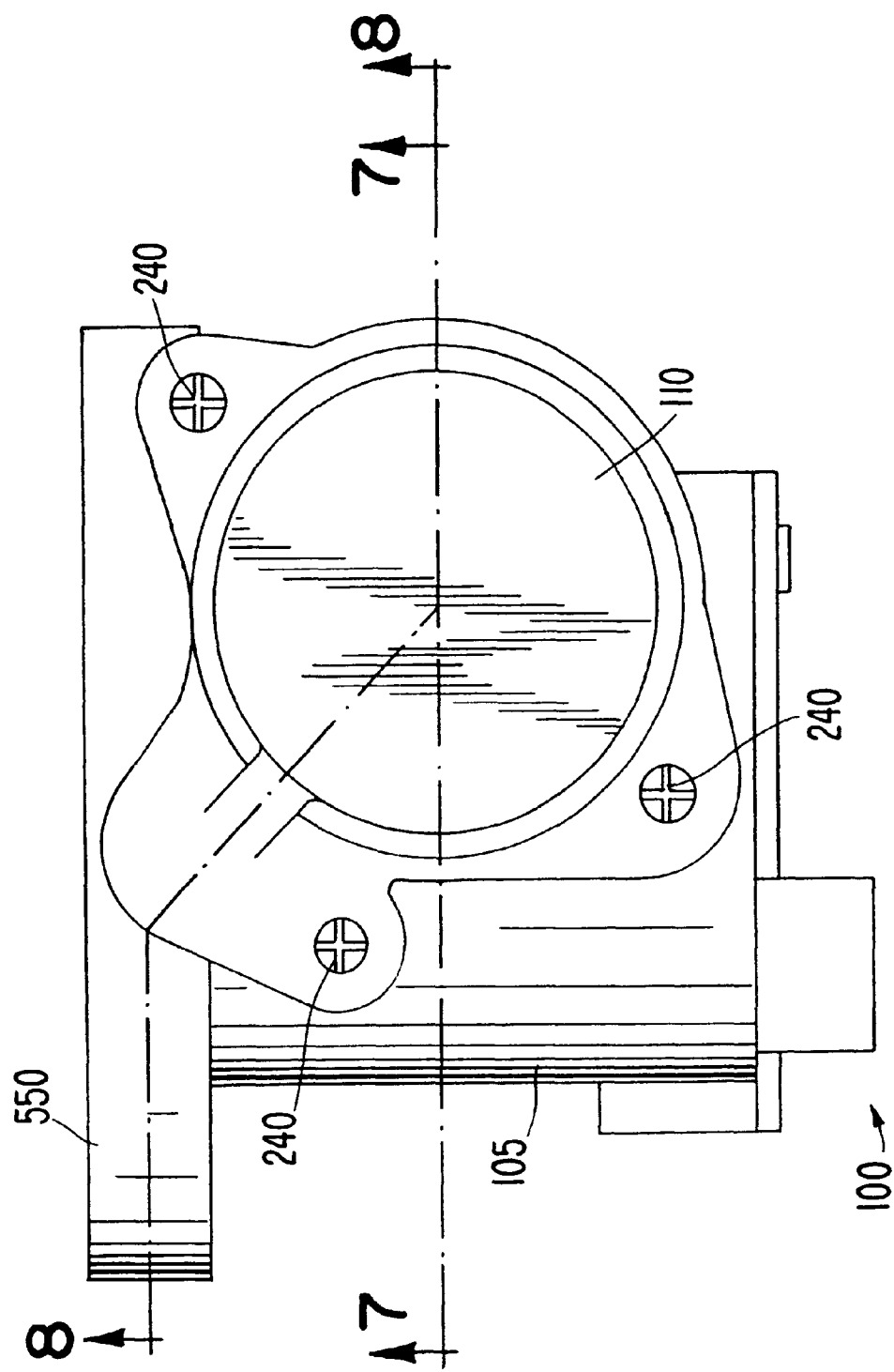
FIG. 6 is a side view of the assembly illustrated in FIG. 2.

FIG. 1 illustrates a flow diagram of an air assist fuel injection system 50 in accordance with one embodiment of the present invention. The illustrated air assist fuel injection system 50 is configured for a two-stroke engine (not illustrated) and includes one fuel injector 990 and one air assist fuel injector 911. Alternative embodiments of the air assist fuel injection system 50 may include more injectors 990, 911 and, depending on the specific engine application, more or less system components than those illustrated in FIG. 1.

During operation of the air assist fuel injection system 50, pressurized gas is supplied to a rail 105 via a gas line 916 and compressor 914. The pressurized gas is then supplied to the air assist fuel injector 911 from the rail 105. A gas pressure regulator 920 is included in the gas supply flow path g and maintains the gas supply pressure at an essentially constant pressure, such as 550 kPa, during operation of the system 50. A gas pressure sensor 933 and a damping volume 921 are also included in the gas supply flow path.

Liquid fuel is also supplied from a fuel tank 980 to the rail 105 via a fuel line 907 and pump 982. Fuel is then supplied to the fuel injector 990 from the rail 105. As illustrated in FIG. 1, a fuel pressure regulator 900 is included in the fuel supply flow path f between the fuel tank 980 and the fuel injector 990 and in the gas supply flow path g between the compressor 914 and the air assist fuel injector 911. The fuel pressure regulator 900 maintains the fuel supply pressure at a generally constant level, such as 650 kPa, during operation of the air assist fuel injection system 50 to ensure proper fuel flow characteristics to and through the injectors 990, 911. As described below in greater detail, the fuel pressure regulator 900 maintains this fuel supply pressure at a constant level by maintaining a pressure differential between the fuel supply pressure and a reference pressure. Because the gas supply pressure is generally constant in the illustrated embodiment, it serves as a reference pressure by which the fuel pressure regulator 900 sets the fuel supply pressure for the injectors 990, 911. During operation of the fuel pressure regulator 900, fuel is returned to the fuel tank 980 via a fuel return line 915.

During operation of the air assist fuel injection system 50, the pressurized fuel is supplied to the fuel injector 990, which in turn delivers a metered quantity of fuel to the air assist fuel injector 911. The pressurized gas is supplied to the air assist fuel injector 911, which atomizes the fuel supplied from the fuel injector 990 and conveys the atomized mixture to the combustion chamber of the engine.

To increase or decrease the speed of the engine, a throttle 912 is adjusted by an operator or computer. In response to this operation, an electronic control unit ("ECU") 918 sends a signal to the fuel injector 990 and/or the air assist fuel injector 911 which decreases or increases the mass flow rate of fuel from the air assist fuel injector 911 to correspondingly increase or decrease the speed of the engine. For example, to increase the volume of fuel delivered by the air assist fuel injector 911 in response to a throttle change, the ECU 918 may: (1) instruct a solenoid of the fuel injector 990 to stay open longer; (2) instruct a solenoid of the air assist fuel injector 911 to stay open longer; and/or (3) change the delay between the respective openings of the injectors 990, 911. Thus, the ECU 918 controls changes in the fuel flow from the injectors 990, 911 while the fuel pressure regulator 900 maintains the fuel supply pressure at a constant level.

The air assist fuel injection system 50 and the air assist fuel injector 911 are termed "air assist" because each preferably utilizes pressurized air to atomize liquid fuel. The pressure of the liquid fuel is preferably higher than that of the air. Although it is preferred that the air assist fuel injector 911 atomize liquid gasoline with pressurized air delivered by the rail 105, it will be realized that the air assist fuel injector 911 may atomize many other liquid combustible forms of energy with any variety of gases. For example, the air assist fuel injector 911 may atomize liquid kerosene or liquid methane with pressurized gaseous oxygen, propane, or exhaust gas. Hence, the terms "air assist fuel injector" and "air assist fuel injection system" are terms of art, and as used herein are not intended to dictate that the air assist fuel injection system 50 or the air assist fuel injector 911 be used only with pressurized air.

FIGS. 2–8 illustrate an assembly 100 of the air assist fuel injection system 50. The assembly 100 includes the rail 105, fuel injector 990, gas inlet fitting 504, fuel inlet fitting 507, fuel outlet fitting 505, the fuel pressure regulator 900, and a cover 110 for the fuel pressure regulator 900. Alternative embodiments of the assembly 100 may include more or less of the components of the system 50. For example, an alternative embodiment of the assembly 100 may also include the gas pressure regulator 920, and the gas pressure sensor 933. In a further embodiment, the assembly 100 only includes the rail 105, fuel pressure regulator 900, and cover 110.

Figure 7:
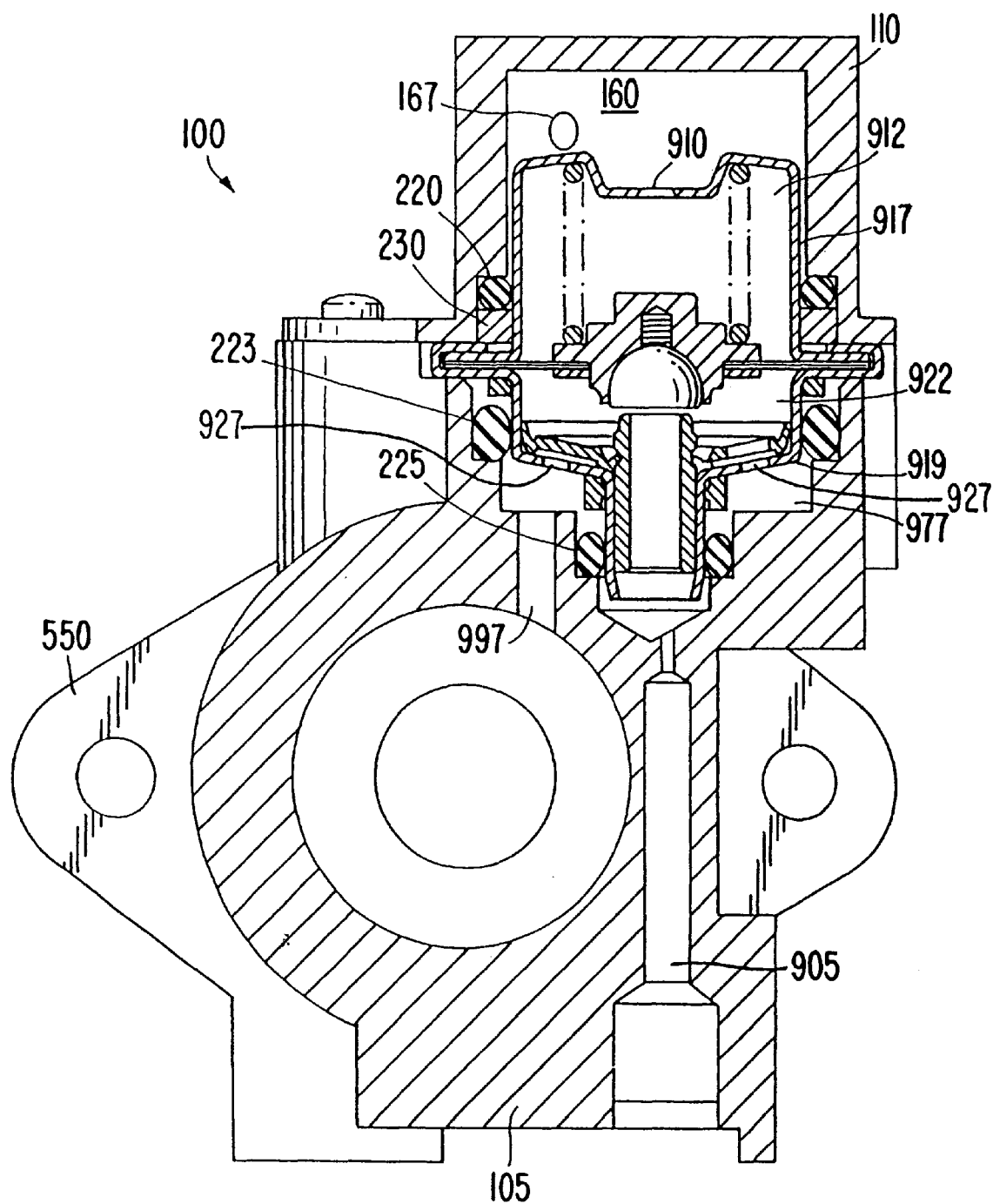
FIG. 7 is a partial cross-sectional view of the assembly illustrated in FIG. 2 take along the line 7—7 in FIG. 6.
Figure 8:
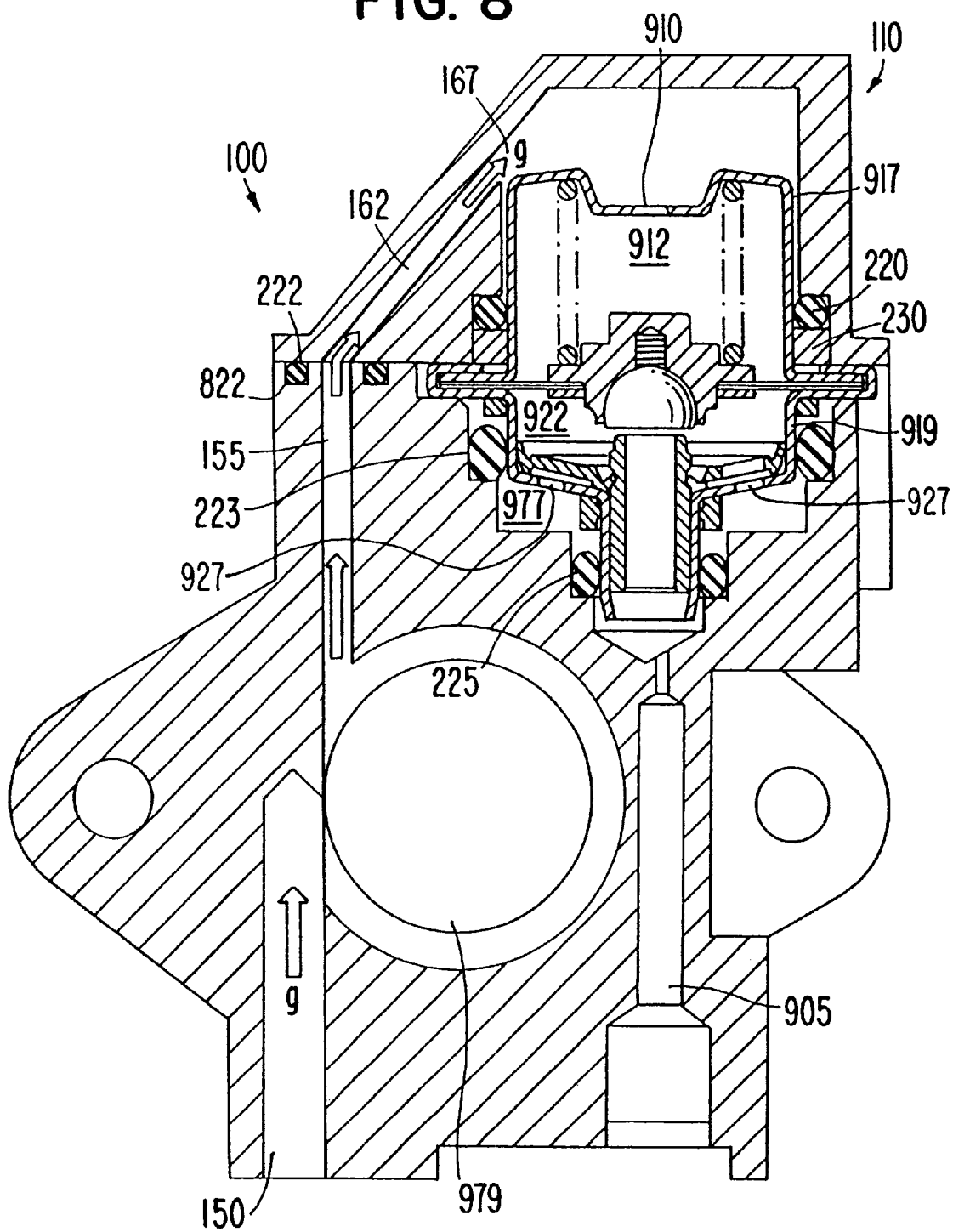
FIG. 8 is a partial cross-sectional view of the assembly illustrated in FIG. 2 taken along the line 8—8 in FIG. 6.
Figure 9:
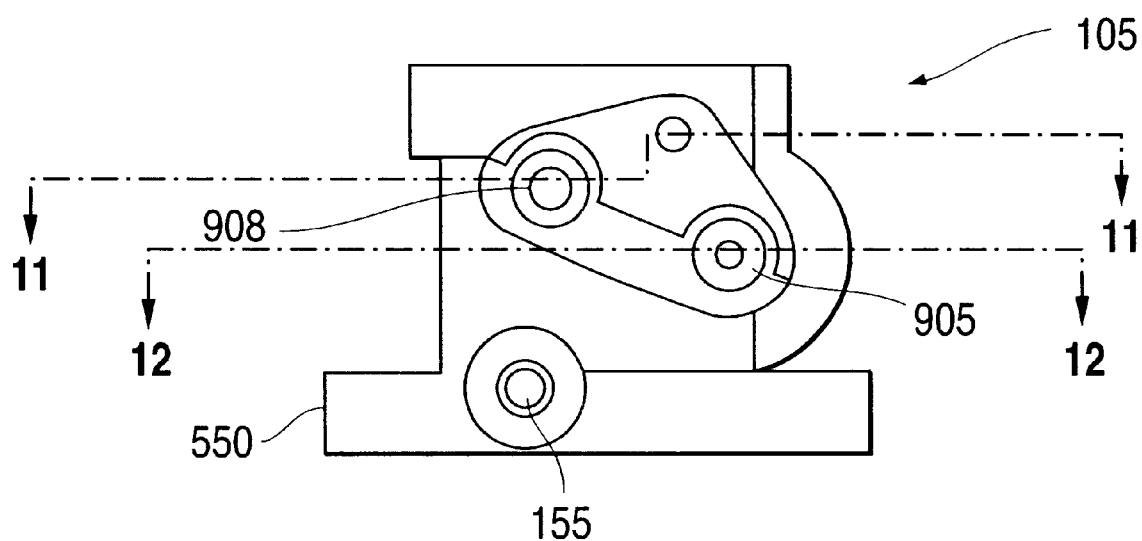
FIG. 9 is a side view of the rail illustrated in FIG. 2.
Figure 10:
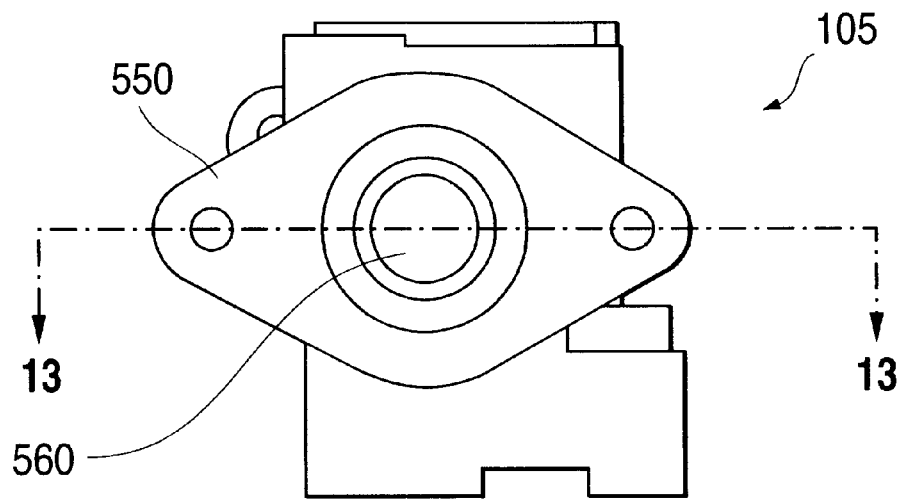
FIG. 10 is a bottom view of the rail illustrated in FIG. 9.
Figure 11:
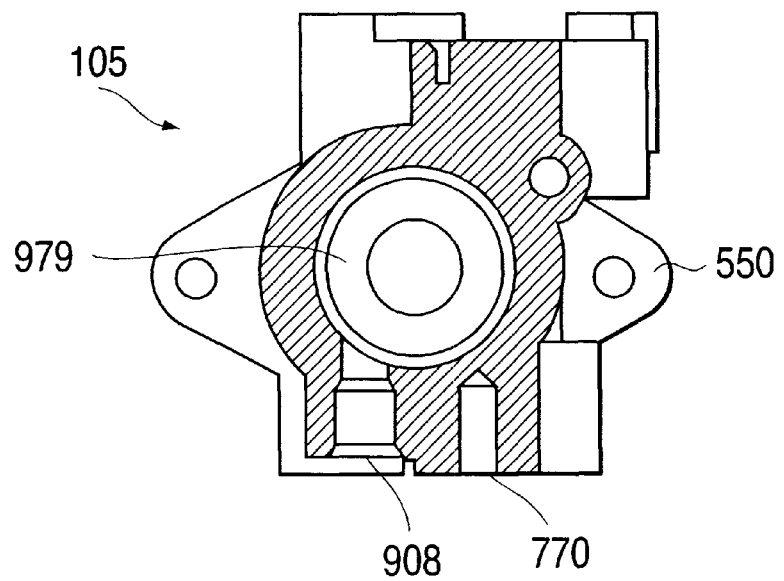
FIG. 11 is a cross-sectional view of the rail illustrated in FIG. 9 taken along the line 11—11 in FIG. 9.
Figure 12:
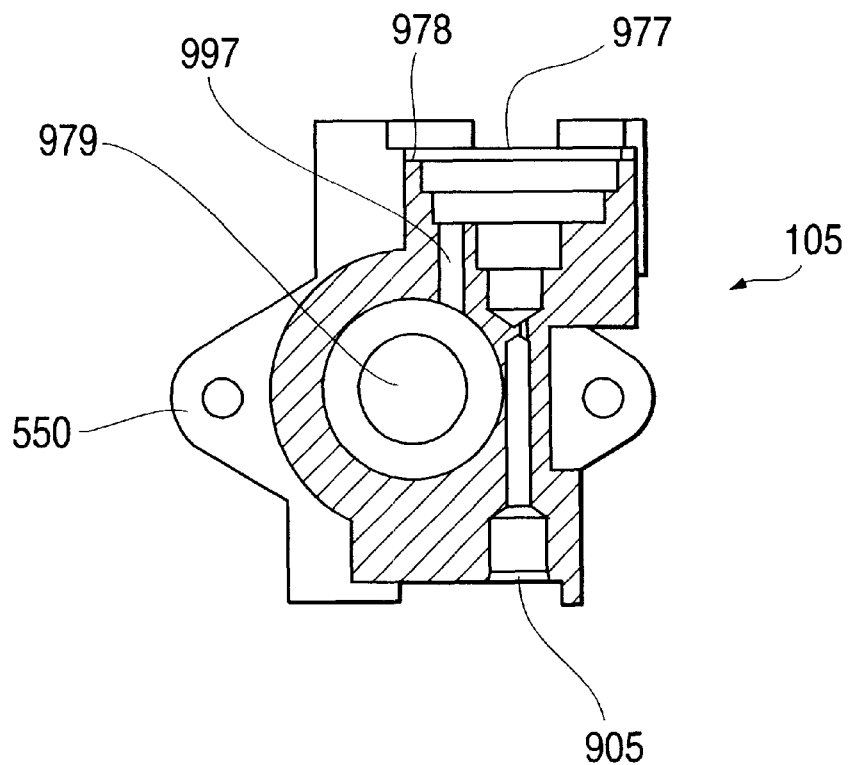
FIG. 12 is a cross-sectional view of the rail illustrated in FIG. 9 taken along the line 12—12 in FIG. 9.

FIGS. 7 and 8 illustrate the fuel pressure regulator 900 retained in the rail 105 by the cover 110, where the fuel injector 990 has been omitted for purposes of illustration. FIGS. 9–13 illustrate further details of the rail 105. As illustrated in FIGS. 7–13, the rail 105 is a body that is configured to receive at least a portion of the fuel pressure regulator 900 and to deliver pressurized gas and fuel for the fuel pressure regulator. In the preferred embodiment, the rail 105 includes conduits 560, 150 for pressurized gas, conduits 908, 997, and 905 for pressurized fuel, a cavity 977 that receives at least a portion of the fuel pressure regulator 900, and a cavity 979 that receives at least a portion of the fuel injector 990. In the illustrated embodiment of the assembly 100, fuel enters the rail 105 via conduit 908 (see FIGS. 9 and 11), where it is conveyed to the annular cavity 979 that receives the fuel injector 990. The fuel in the cavity 979 enters the inlet of the fuel injector 990 received by the rail 105 and is also communicated to the cavity 977 via a conduit 997 (see FIGS. 7 and 12), where the fuel is received by the fuel pressure regulator 900. Hence, the conduit 907 conveys fuel for the fuel injector 990 and the fuel pressure regulator 900. As described below, the fuel exits the fuel pressure regulator 900, for eventual return to the fuel tank 980, via the fuel return conduit 905 (see FIGS. 7, 8 and 12).

The base 550 of the rail 105 is configured to mount to the head of an engine in which the air assist fuel injector 911 is located and includes a cavity 561 that receives the inlet of the air assist fuel injector 911. The inlet of the air assist fuel injector 911 is located directly downstream of the outlet of the fuel injector 990 such that the fuel injector 990 housed in the fuel injector cavity 979 delivers a metered quantity of fuel directly to the inlet of the air assist fuel injector 911.

Figure 13:
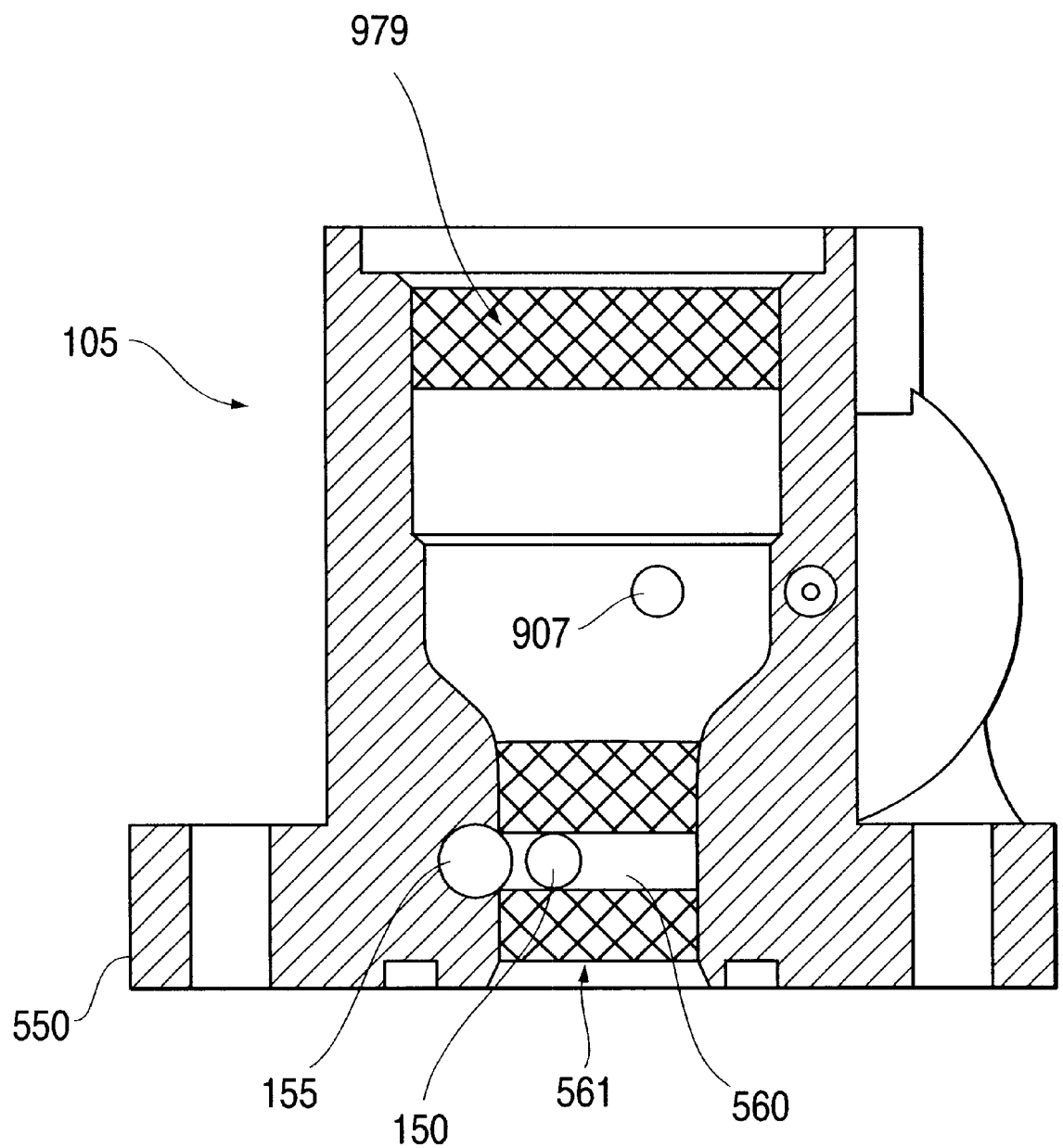
FIG. 13 is a cross-sectional view of the rail illustrated in FIG. 9 taken along the line 13—13 in FIG. 10.

The pressurized gas enters the rail 105 via conduit 155, which conveys the pressurized gas to the conduit 560 surrounding the inlet to the air assist fuel injector 911. The pressurized gas in the annular conduit 560 enters the inlet of the air assist fuel injector 911 with the fuel from the fuel injector 990, and the air assist fuel injector 911 utilizes the pressurized gas to atomize the liquid fuel. As illustrated in FIGS. 8 and 13, the pressurized gas in conduit 560 is also communicated to the cover 110 via the conduit 150. Hence, the conduit 155 communicates pressurized gas for the air assist fuel injector 911 and the fuel pressure regulator 900.

The rail 105 may take other configurations. For example, in an alternative embodiment, the rail 105 does not receive the fuel injector 990 or the air assist fuel injector 911. In this alternative embodiment, the fuel injector 990 and/or the air assist fuel injector 911 are mounted to the head of an engine or another body separate from the rail 105. The rail 105 may also include differently configured conduits for conveying pressurized gas and fuel. For example, the rail 105 may include a first passageway that only delivers pressurized gas to the air assist fuel injector 911 and a second passageway that only delivers pressurized gas to the pressure regulator.

Figure 14:
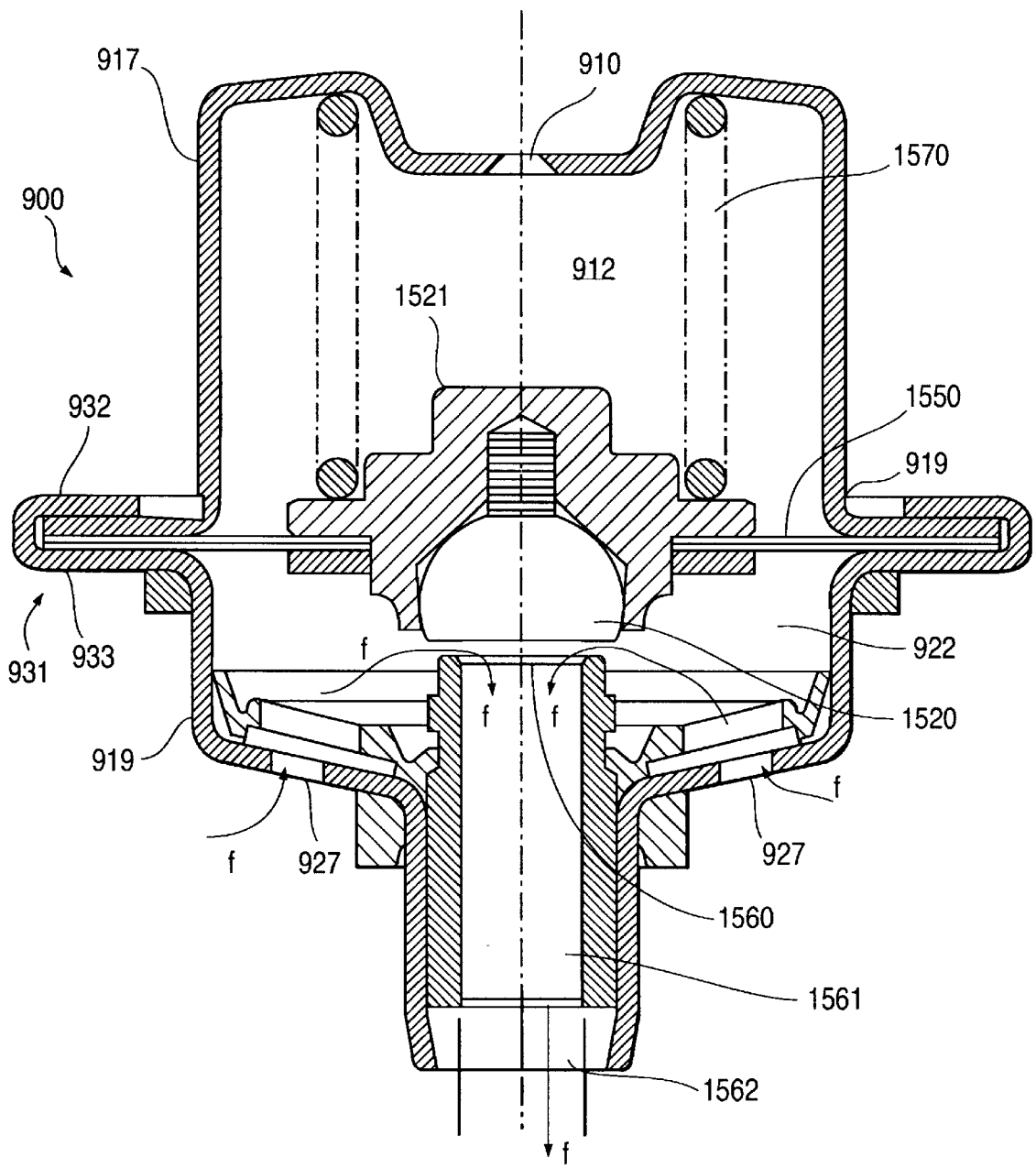
FIG. 14 is a cross-sectional view of the pressure regulator of the assembly illustrated in FIG. 2.
Figure 15:
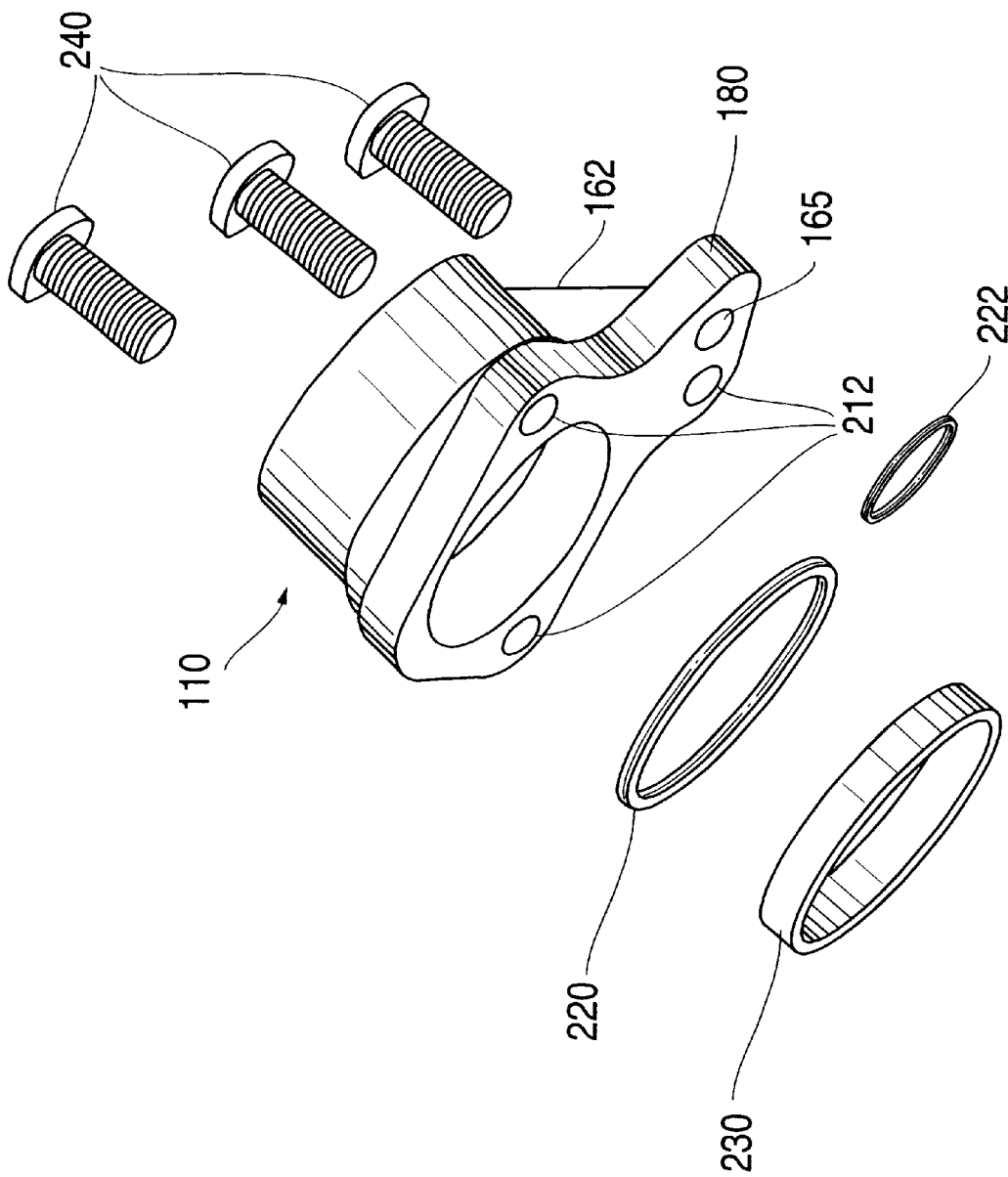
FIG. 15 is a partial exploded view the assembly illustrated in FIG. 2.
Figure 18:
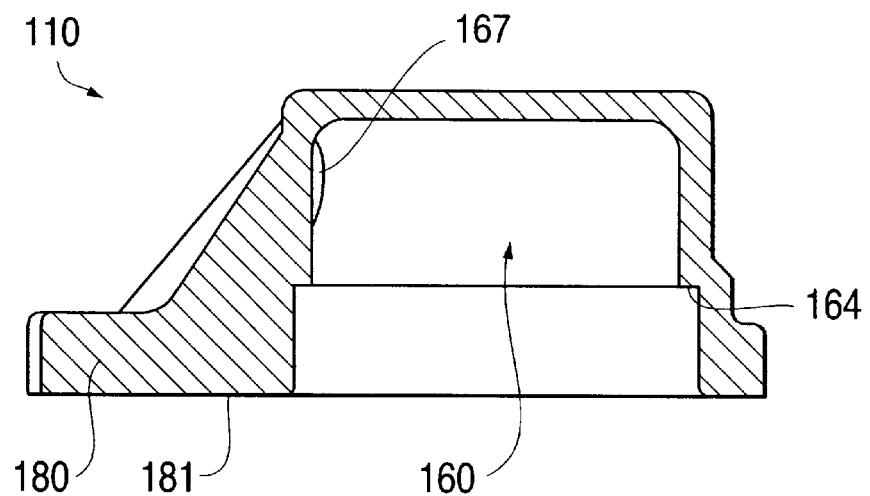
FIG. 18 is a cross-sectional view of the cover illustrated in FIG. 2 taken along the line 18—18 in FIG. 17.
Figure 19:
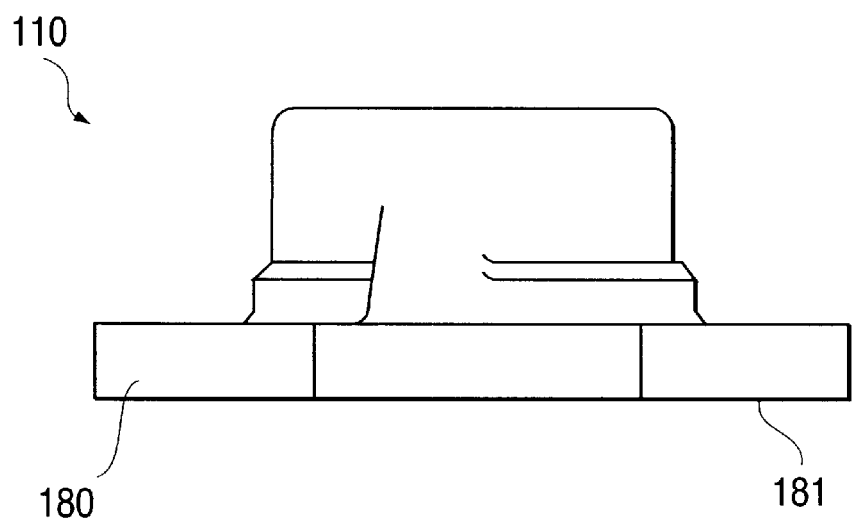
FIG. 19 is a rear view of the cover illustrated in FIG. 2.
Figure 20:
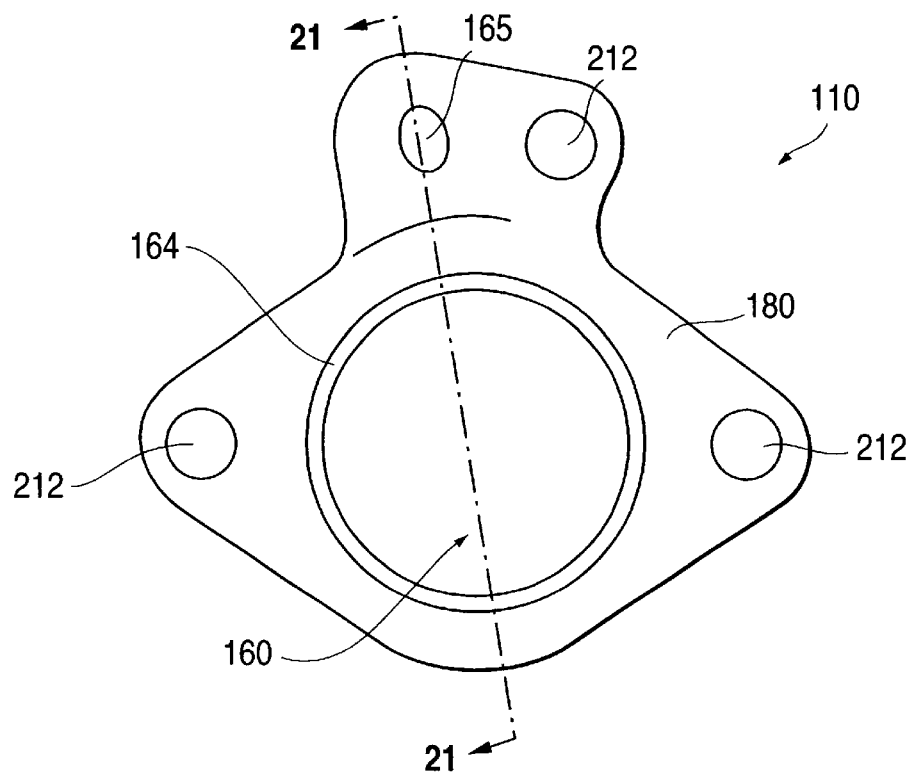
FIG. 20 is a bottom view of the cover illustrated in FIG. 2.
Figure 21:
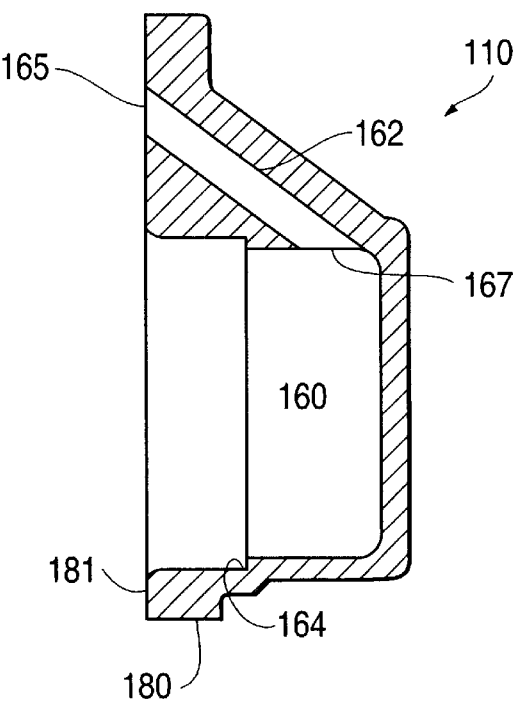
FIG. 21 is a cross-sectional view of the cover illustrated in FIG. 2 taken along the line 21—21 in FIG. 20.

As described above, the assembly 100 also includes the pressure regulator 900, which is located at least partially within the cavity 977 of the rail 105 and is configured to maintain a pressure differential between the pressurized fuel supply and the pressurized gas supply. As illustrated in FIGS. 7, 8 and 14, the pressure regulator 900 includes a gas reference chamber 912 defined by a gas reference housing 917, and a fuel chamber 922 defined by a fuel housing 919. The cover 110 is sealingly attached to the rail 105, covers the pressure regulator 900, and fluidly communicates the conduit 150 and the gas reference chamber 912 as indicated by the gas flow path g.

The gas reference chamber 912 includes a gas reference inlet 910 that receives the pressurized gas fluidly communicated from the conduit 150. The fuel chamber 922 includes a fuel inlet 927 that receives fuel communicated to the cavity 977 from the conduit 997. The fuel enters the fuel chamber 922 via the inlet 927 and, under certain conditions described below, exits the pressure regulator 900 through a fuel outlet 1562 of a conduit 1561. As illustrated in FIGS. 7, 8 and 14 a flexible, impermeable diaphragm 1550 is located between the gas reference chamber 912 and the fuel chamber 922. A stopper 1520 is attached to the diaphragm 1550 directly adjacent the inlet 1560 of the conduit 1561 and spring 1570 is located between the gas reference housing 917 and the diaphragm 1550. When the force on the fuel side of the diaphragm 1550 (due to the fuel pressure in the fuel chamber 922) is less than the force on the gas side of the diaphragm (due to the gas pressure and the force of the spring), the stopper 1520 will be biased toward the inlet 1560 of the conduit 1561 such that it seals the inlet of the conduit 1561 and fuel does not flow out of the pressure regulator outlet 1562. When the stopper 1520 is in this position, the pressure regulator 900 is "closed".

When the pressure regulator 900 is closed, the pump 982 will gradually increase the fuel pressure until the force on the fuel side of the diaphragm 1550 (due to the pressure of the fuel in the fuel chamber 922) is greater than the force on the gas side of the diaphragm (due to the gas pressure in the gas reference chamber 912 and the force of the spring 1570). When this occurs, the diaphragm 1550 and the attached stopper 1520 will move away from the inlet 1560 of the conduit 1561 such that the fuel flows through the conduit 1561 and out the outlet 1562 of the fuel pressure regulator 900 as indicated in FIG. 14 by the fuel flow path f. As illustrated in FIGS. 7, 8 and 14, when the stopper 1520 is not abutting the inlet 1560, the fuel pressure regulator 900 is "open" and fuel flows through the fuel pressure regulator. When the pressure regulator 900 is open, the fuel returns to the fuel tank 980 via the conduit 905 and the fuel return line 915. This decreases the head or pressure of the fuel supply to the injectors 990, 911. The pressure of the fuel supply will continue to decrease until the force on the fuel side of the diaphragm 1550 is less than the force on the gas side of the diaphragm 1550 such that the fuel pressure regulator 990 is closed. This opening and closing of the fuel pressure regulator 900 will repeatedly occur as the fuel supply pressure slightly rises and falls during operation of the system 50.

As will be appreciated, the fuel pressure regulator 900 maintains a pressure differential between the gas supply pressure and the fuel supply pressure, where the pressure differential is proportional to the biasing force of the spring 1570. Because the gas supply pressure is generally constant during operation of the system 50, the pressure regulator 900 thus maintains the fuel supply pressure at a substantially constant level, which ensures proper fuel flow characteristics through the injectors 990, 911 at different fueling levels.

In alternative embodiments of the assembly 100, the fuel pressure regulator 900 takes other configurations. For example, the fuel pressure regulator may control the fuel supply pressure based on the gas supply pressure with an electronic valve and pressure sensor.

FIGS. 15–21 illustrate one preferred embodiment of the cover 110 in greater detail. As described above, the cover 110 is essentially a lid or top configured to cover at least a portion of the fuel pressure regulator 900 and configured to fluidly communicate pressurized gas to the fuel pressure regulator.

The illustrated embodiment of the cover 110 includes a base member 180 having a face 181 that abuts the rail 105 when the cover is attached to the rail 105. The cover 110 is preferably attached to the rail 105 with fasteners, such as the threaded bolts 240 illustrated in FIGS. 2–6 and 15. However, the cover 110 can be attached to the rail 105 in other manners. For example, the base member 180 can be attached to the rail 105 with a weld, glue, clamp, or other fastening device.

The cover 110 also includes a cavity 160 that receives at least a portion of the pressure regulator 990, specifically the end of the gas reference housing 917 having the reference inlet 910. The cover 110 further includes an integral passageway 162, which extends through the base member 180 and into the cavity 160. Passageway 162 has an inlet 165 at the face 181 of the base member 180 and an outlet 167 at the cavity 160. When the cover 110 is attached to the rail 150, the inlet 165 is aligned with the conduit 150 such that the conduit 150 and the passageway 162 are in fluid communication. The passageway 162 fluidly communicates pressurized gas from the conduit 150 to the cavity 160, which is in fluid communication with the reference inlet 910 of the fuel pressure regulator 900. Hence, the cover 110 is configured to fluidly communicate pressurized gas from the rail 105 to the reference inlet 910 of the fuel pressure regulator 900.

In the embodiment illustrated in FIGS. 7 and 8, seals are located between the rail 105 and the cover 110 and between the cover 110 and the fuel pressure regulator 900. The seal between the cover and the fuel pressure regulator 900 is defined by a seal member 220. The seal defined by the seal member 220 prevents gas from leaking from the junction between the rail 105 and the cover 110 and from entering the cavity 977 of the rail 105. The cavity 160 of the cover 110 includes a ledge or seat 164 that provides a seat for the seal member 220. The seal member 220 abuts the seat 164, the cover 110, the reference housing 917, and a retainer 230 to define a seal between the cover 110 and the reference housing 917 of the pressure regulator 900. The retainer 230 is an annular member that receives the pressure regulator 900, defines a portion of a cavity for the seal member 220, and locates the seal member 220 away from any crimps in the housing 917 of the pressure regulator that may damage the seal member 220.

The seal between the cover 110 and the rail 105 is defined by a seal member 222. The seal defined by the seal member 222 prevents gas from leaking from the junction between the rail 105 and the cover 110, where the conduit 162 and the conduit 150 are in fluid communication. As illustrated in FIG. 8, the rail 105 includes a recessed seat 822 for the seal member 222.

The assembly 100 further includes two additional seals between the pressure regulator 900 and the rail 105, which are defined by seal members 223, 225. The seal defined by seal member 223 prevents pressurized fuel from leaking from the junction between the rail 105 and the cover 110 and from entering the cavity 160 of the cover 110. The seal defined by the seal member 225 separates the fuel entering the fuel pressure regulator 900 from the fuel exiting the pressure regulator. The seal members 220, 222, 223, 225 are preferably elastomeric o-rings.

To assemble the assembly 100, the fuel injector 990 is located in the fuel injector cavity 979 of the rail 105. A clamp 770 is installed to maintain the fuel injector 979 within the rail 105. The seal members 223, 225 are installed in the rail 105. The fuel pressure regulator 900 is then placed in the pressure regulator cavity 977 of the rail 105. The retainer 230 and seal member 220 are placed over the gas reference housing 917 of fuel pressure regulator 900. Seal 222 is placed in the seat 822 on the rail 105. The cover 110 is then attached to the rail 105 with the fasteners 240 such that the fuel pressure regulator 900 is covered by the cover 110 and retained in the rail. The gas inlet fitting 504, the fuel inlet fitting 507, and the fuel outlet fitting 505 are then attached to the rail 105. A clamp 777 is installed to aid in maintaining the fuel fittings 505, 507 in the rail 105. After the assembly 100 is complete, the rail 105 is mounted to the head of an engine (not illustrated) such that the cavity 561 receives the inlet of the air assist fuel injector 911. It will be appreciated that the order of the above-noted assembly steps may vary. For example, the fuel injector 990 may be located in the rail 105 before the pressure regulator 900.

Besides communicating pressurized gas to the fuel pressure regulator 900, the preferred embodiment of the cover 110 also retains the pressure regulator 900 within the rail 105. That is, the cover 110 biases the pressure regulator 900 against the rail 105 so as to maintain the pressure regulator 900 in place within cavity 977 of the rail 105. When assembled, the bottom face 181 of the cover 110 abuts the upper surface 932 of the pressure regulator flange 931, and the bottom surface 933 of the pressure regulator flange 931 abuts a seat 978 in the cavity 977 of the rail 105. Hence, the force attaching the cover 110 to the rail 105 retains the cover 110 in the rail 105. Because the pressure regulator 900 is not independently fixed to the rail 105, it is easily installed and removed, simplifying the assembly and disassembly of the assembly 100.

In alternative embodiments, the pressure regulator 900 is retained in the rail 105 in other manners. For example, the cover 110 may bias opposing surfaces of the cover 110, pressure regulator 900, and rail 105 in the radial direction of the pressure regulator. In a further embodiment of the assembly 100 of the present invention, the cover 110 does not retain the pressure regulator 900 within the rail 105. For example, the cover 110 may be independently fixed to the rail 105 with separate fasteners.

Figure 22:
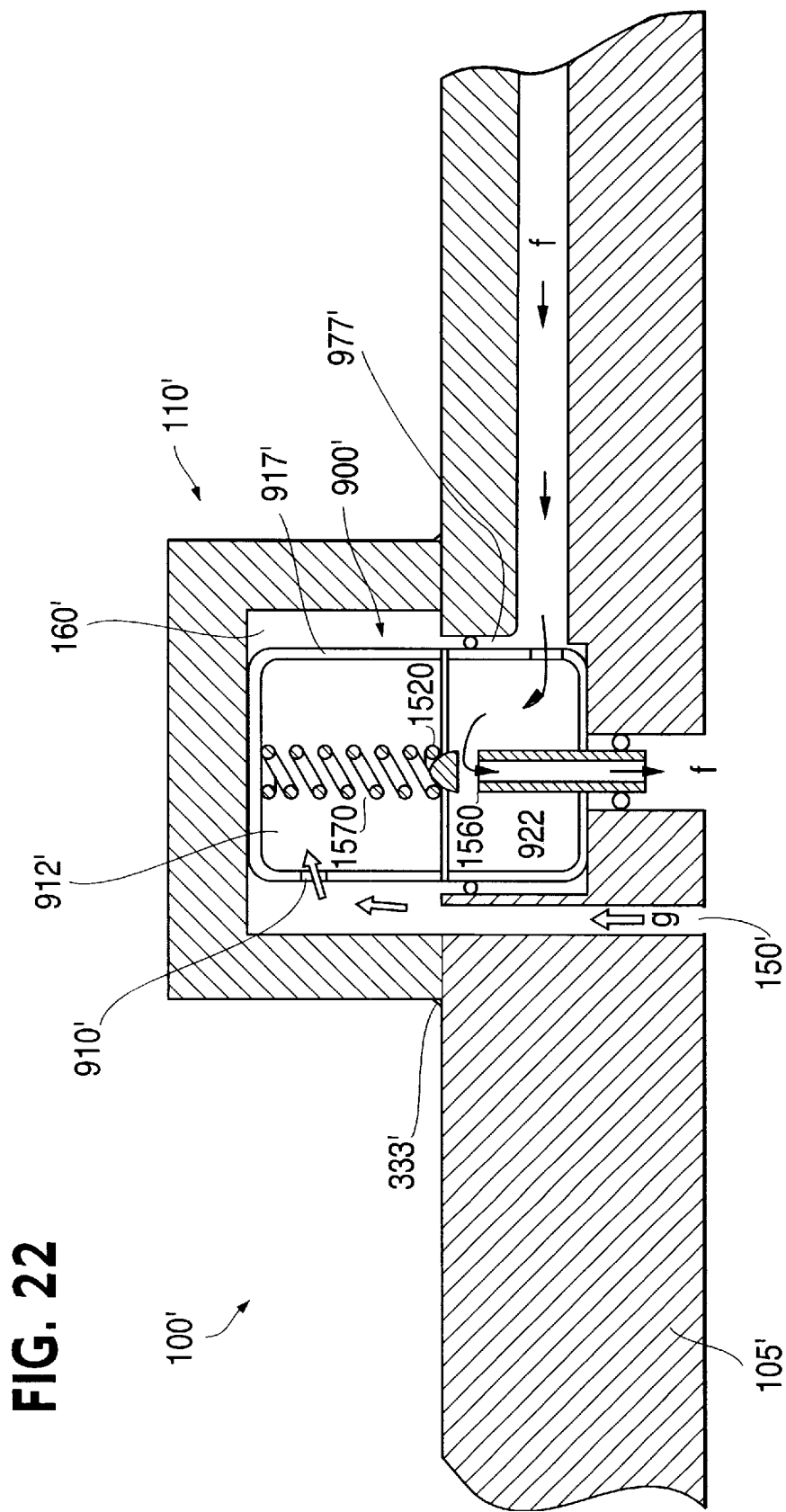
FIG. 22 is a cross-sectional and schematic view of an assembly of the air assist fuel injection system illustrated in FIG. 1 in accordance with another embodiment of the present invention.

While the preferred embodiment of the cover 110 is illustrated, it will be appreciated that the cover 110 may take alternative configurations that are also effective to fluidly communicate pressurized gas from the rail 105 to the reference inlet 910 of the pressure regulator 900. For example, FIGS. 22 and 23 illustrate embodiments of assemblies 100', 100" having covers 110', 110" that do not include a conduit 162 for delivering pressurized gas to the fuel pressure regulator 900. Because the assemblies 100', 100" are functionally similar and share a number of similar parts, like numbered parts of the assembly 100 refer to like numbered parts of the assemblies 100' and 100".

As illustrated in FIG. 22, the cover 110' is hermetically welded to the rail 105' with a weld 333', and includes a cavity 160' that fluidly communicates the conduit 150' and the gas reference chamber 912'. The conduit 150' is located within the periphery of the cavity 160' and is thus in fluid communication with the cavity 160'. Hence, the cover 110' fluidly communicates pressurized gas from the conduit 150' to the gas reference inlet 910' of the fuel pressure regulator 900'. In the illustrated embodiment, the pressure regulator 900' is retained within cavity 977' of rail 105' by the direct contact of the inner surface of the cover 110' against the upper surface of the gas reference housing 917' and by the contact of the bottom surface of the pressure regulator 900' against the bottom surface of the cavity 977'. The reference inlet 910' is located at the side of the gas reference housing 917' to fluidly communicate gas to the gas reference chamber 912'.

In the assembly 100" illustrated in FIG. 23, the pressure regulator 900" is located entirely within the cavity 977" of the fuel rail 105". Rather than having a cavity that receives the pressure regulator 900", the cover 110" is a planar body that covers the cavity 977". The cover 110" is sealingly coupled to the rail 105" via bolts 240" and a seal member 220" so as to seal the cavity 977". Because the cover 110" seals the cavity 977" and the conduit 150" opens into the cavity 977", the cover defines a portion of a conduit that conveys pressurized gas to the gas reference inlet 910" and fluidly communicates pressurized gas from the conduit 150" to the reference chamber 912" of the pressure regulator 900". The inner surface of the cover 110" abuts the top surface of the housing 917" of the pressure regulator 900" and the bottom surface of the pressure regulator 900" abuts a seat 978" to retain the pressure regulator 900" within the cavity 977" of rail 105".

As will be appreciated, the covers 110, 110', 110" according to the present invention fluidly communicate pressurized gas to the respective pressure regulators 900, 900', 900" without exposed hoses and connectors, which are conventionally susceptible to damage during high pressure and temperature engine conditions. Hence, the assemblies 100, 100', 100" of the present invention are generally more reliable than some conventional pressure regulator assemblies that utilized exposed hoses and connectors. In addition, because each pressure regulator 900, 900', 900" is retained in the respective rail 105, 105, 105" by the cover 110, 110', 110", the assemblies 100, 100', 100" are easy to assemble and disassemble, decreasing manufacturing complications and simplifying replacement or repair of the assembly components.

We claim:

1. An assembly comprising:

a fuel injector;

a pressure regulator having a gas reference chamber and a fuel chamber separated by a diaphragm, said gas reference chamber having an inlet;

a rail having a conduit for supplying pressurized fuel for said fuel chamber, a conduit for supplying pressurized gas for said gas reference chamber, a conduit for supplying pressurized air for an air assist fuel injector, a cavity that receives at least a portion of said pressure regulator, and a cavity that receives at least a portion of said fuel injector, said conduit for supplying pressurized gas for said gas reference chamber being in fluid communication with said conduit for supplying pressurized gas for said air assist fuel injector; and a cover attached to said rail and covering said pressure regulator, said cover including a passageway that fluidly communicates said conduit for supplying pressurized gas for said gas reference chamber and said cavity that receives at least a portion of said pressure regulator.

2. An assembly for an air assist fuel injection system, comprising:

a pressure regulator having a housing that defines a gas reference chamber and a fuel chamber;

a rail having a conduit for supplying pressurized fuel for said fuel chamber, a conduit for supplying pressurized gas for said gas reference chamber, a conduit for supplying pressurized air for an air assist fuel injector, a cavity that receives at least a portion of said pressure regulator, and a cavity for receiving at least a portion of a fuel injector, said conduit for supplying pressurized gas for said gas reference chamber being in fluid communication with said conduit for supplying pressurized gas for said air assist fuel injector; and means for communicating gas from said conduit for supplying pressurized gas for said gas reference chamber to said gas reference chamber via a cover attached to said rail and that covers said pressure regulator.

3. The assembly of claim 2, said cover including a cavity that receives at least a portion of said pressure regulator.

4. The assembly of claim 3, said cover including a passageway for fluidly communicating pressurized gas to said cavity.

5. The assembly of claim 2, further comprising a sealing means abutting said cover and said rail to define a seal between said cover and said rail.

6. An assembly for an air assist fuel injection system, comprising:

a pressure regulator configured to maintain a pressure differential between a fuel supply and a gas supply of the air assist fuel injection system, said pressure regulator having a housing that defines a gas reference chamber; and a cover attached to a rail and covering said housing of said pressure regulator, said rail being configured to supply pressurized gas to said cover, pressurized gas to an air assist fuel injector, and fuel to a fuel injector, said cover being configured to fluidly communicate the pressurized gas from said rail to said gas reference chamber.

7. The assembly of claim 6, said cover including a cavity that receives at least a portion of said pressure regulator.

8. The assembly of claim 7, said portion including said housing of said pressure regulator that defines said gas reference chamber.

9. The assembly of claim 7, said cover including a passageway for fluidly communicating pressurized gas to said cavity.

10. The assembly of claim 7, said cavity including a seat for a seal member.

11. The assembly of claim 7, further comprising a seal member that abuts said cover and said rail to define a seal between said cover and said rail.

12. The assembly of claim 6, said cover being attached to said rail with fasteners.

13. The assembly of claim 6, said cover being attached to said rail with a weld.

14. The assembly of claim 6, said rail having a cavity that receives at least a portion of a fuel injector.

15. The assembly of claim 6, said rail having a cavity that receives at least a portion of said pressure regulator.

16. The assembly of claim 6, said rail having another cavity that receives at least a portion of an air assist fuel injector.

17. An assembly for an air assist fuel injection system, comprising:

a fuel injector;

a pressure regulator having a gas reference chamber and a fuel chamber defined by a housing and being separated by a diaphragm;

a rail having a conduit for supplying pressurized fuel for said fuel chamber, a conduit for supplying pressurized gas for said gas reference chamber, a conduit for supplying pressurized air for an air assist fuel injector, a cavity that receives at least a portion of said pressure regulator, and a cavity that receives at least a portion of said fuel injector, said conduit for supplying pressurized gas for said gas reference chamber being in fluid communication with said conduit for supplying pressurized gas for said air assist fuel injector; and a cover attached to said rail and covering said housing of said pressure regulator, said cover including a passageway that fluidly communicates said conduit for supplying pressurized gas for said gas reference chamber and said cavity that receives at least a portion of said pressure regulator.

18. A method of maintaining a pressure differential between a fuel supply and a gas supply of an air assist fuel injection system comprising:

communicating via a rail fuel to a fuel chamber of a pressure regulator, the fuel chamber being defined by a housing of the pressure regulator;

communicating via the rail pressurized gas to a gas reference chamber of the pressure regulator, the gas reference chamber being defined by the housing of the pressure regulator and being covered by a cover that is attached to the rail;

communicating via the rail pressurized gas to an air assist fuel injector; and communicating via the rail fuel to a fuel injector.

19. An assembly for an air assist fuel injection system, comprising:

a pressure regulator having a housing that defines a gas reference chamber and a fuel chamber;

a rail having a conduit for supplying pressurized fuel for said fuel chamber, a conduit for supplying pressurized gas for said gas reference chamber, a conduit for supplying pressurized air for an air assist fuel injector, a cavity that receives at least a portion of said pressure regulator, and a cavity for receiving at least a portion of a fuel injector, said conduit for supplying pressurized gas for said gas reference chamber being in fluid communication with said conduit for supplying pressurized gas for said air assist fuel injector; and a cover attached to said rail and covering said pressure regulator, said cover being configured to communicate gas from said conduit for supplying pressurized gas for said gas reference chamber to said gas reference chamber.

20. An assembly for an air assist fuel injection system, comprising:

pressure regulator means for maintaining a pressure differential between a fuel supply and a gas supply of the air assist fuel injection system, said pressure regulator having a housing that defines a gas reference chamber;

a rail having means for supplying pressurized fuel for said fuel chamber, means for supplying pressurized gas for said gas reference chamber, means for supplying pressurized air for an air assist fuel injector, a cavity that receives at least a portion of said pressure regulator, and a cavity for receiving at least a portion of a fuel injector, said means for supplying pressurized gas for said gas reference chamber being in fluid communication with said means for supplying pressurized gas for said air assist fuel injector; and means for communicating gas from said conduit for supplying pressurized gas for said gas reference chamber to said gas reference chamber via a cover attached to said rail and that covers said pressure regulator.

* * * * *